United States Patent [19]
Makar et al.

[11] Patent Number: 5,891,520
[45] Date of Patent: Apr. 6, 1999

[54] METHOD FOR SCREEN PRINTING GLASS ARTICLES

[75] Inventors: Onsy Y. Makar, Framingham; Paul J. Caruso, Bedford, both of Mass.

[73] Assignee: Avery Dennison Corporation, Pasadena, Calif.

[21] Appl. No.: 884,713

[22] Filed: Jun. 30, 1997

[51] Int. Cl.$^6$ .................................. B05D 1/32; B05D 5/04
[52] U.S. Cl. .......................... 427/269; 427/282; 427/287; 427/389.7; 427/407.2
[58] Field of Search ..................................... 427/282, 389, 427/384, 407.2, 269, 287; 101/129; 106/31.05, 31.49, 31.58, 31.78, 31.86; 524/88, 560, 601, 847

[56] References Cited

U.S. PATENT DOCUMENTS

| | | | |
|---|---|---|---|
| 3,872,044 | 3/1975 | Hervey et al. | 260/30.8 R |
| 3,907,974 | 9/1975 | Smith . | |
| 3,920,469 | 11/1975 | Kienzle et al. | 106/288 |
| 3,961,965 | 6/1976 | Zwahlen | 106/22 |
| 4,043,824 | 8/1977 | Wagar . | |
| 4,057,436 | 11/1977 | Davies et al. | 106/288 |
| 4,416,974 | 11/1983 | Scheve . | |
| 4,935,300 | 6/1990 | Parker et al. . | |
| 5,217,255 | 6/1993 | Lin et al. . | |
| 5,238,881 | 8/1993 | Norris . | |
| 5,275,649 | 1/1994 | Linke et al. . | |
| 5,389,717 | 2/1995 | Santini et al. . | |
| 5,549,929 | 8/1996 | Scheibelhoffer et al. | 427/282 |

OTHER PUBLICATIONS

"Hawley's Condensed Chemical Dictionary", 13th Ed., Richard J. Lewis, Sr. pp. 995–996, 1997.
Pocket Pal: a graphic arts production handbook, International Paper Company, Memphis, TN (1989).

*Primary Examiner*—Shrive Beck
*Assistant Examiner*—Fred J. Parker
*Attorney, Agent, or Firm*—Kriegsman & Kriegsman

[57] ABSTRACT

A method for decorating and/or labelling glass articles and like ceramic ware by screen printing. The present method comprises the steps of (a) treating a glass article or the like with a silane adhesion promoter; and (b) applying a non-ceramic screen ink directly onto the silane-treated glass article by screen printing. The non-ceramic screen ink is preferably a heat-set ink which includes an organic resinous binder, a non-heavy metal colorant and a vaporizable solvent system. Examples of the binder include, but are not limited to, one or more of polyamide, polyester, polyester-vinyl, acrylic, vinyl and acrylic-vinyl resins. Examples of the non-heavy metal colorant include titanium dioxide and organic colorants (e.g., insoluble derivatives of organic dyes). The non-ceramic screen ink may additionally comprise one or more rheology-adjusting agents for making the ink well-suited for screen printing and may additionally include other additives of the type commonly found in screen or other printing inks. Once the ink has been applied to the glass article by screen printing, the printed article is preferably heated, causing the solvent system to be driven off and causing the binder, colorant and other non-volatile components of the ink to be set on the article.

13 Claims, No Drawings

METHOD FOR SCREEN PRINTING GLASS ARTICLES

BACKGROUND OF THE INVENTION

The present invention relates generally to techniques for decorating and/or labelling articles and more particularly to a novel method for screen printing glass articles and like ceramic ware.

The decorating and/or labelling of commercial articles, such as, and without limitation to, containers, clothing materials, construction materials, artwork and the like, is widespread and well-known. One established technique for decorating and/or labelling articles is screen printing. Screen printing typically uses a porous screen of fine silk, stainless steel or a similarly suitable synthetic fiber that is mounted on a frame. A stencil is produced on the screen, either manually or photomechanically, in which the non-printing areas are protected by the stencil. Printing is screen by applying ink with a paint-like consistency to the screen, and then spreading and forcing the ink through the openings of the screen with a rubber squeegee onto the underlying substrate.

One of the desirable aspects of screen printing is that a thick layer of ink can be deposited onto a desired substrate. Another desirable aspect of screen printing is that a variety of different types of materials can be decorated by screen printing; however, heretofore, the type of material being printed upon has, to some extent, limited the type of screen ink that could be used in printing thereon. For example, ceramic materials, including glass articles, have heretofore required the use of ceramic screen inks. Ceramic screen inks typically include a ceramic material, such as silicon dioxide, which is doped with an inorganic pigment (which is often a derivative of a heavy metal). Such inks typically further include a liquid vehicle, said vehicle often comprising a dispersant and a suitable solvent. If necessary, additives for adjusting the rheology of the ink for screen printing, or other desirable additives, are also included. After a glass or other ceramic article has been screen printed with a ceramic screen ink of the foregoing type, the printed article is typically fired to a very high temperature, causing the liquid vehicle to be burned-off and causing the doped ceramic material to become fused to the article.

Examples of ceramics inks suitable for screen printing are disclosed in the following U.S. patents, all of which are herein incorporated by reference: U.S. Pat. No. 4,043,824, inventor Wagar, issued Aug. 23, 1977; U.S. Pat. No. 4,416,974, inventor Scheve, issued Nov. 22, 1983; U.S. Pat. No. 5,275,649, inventors Linke et al., issued Jan. 4, 1994; and U.S. Pat. No. 5,238,881, inventor Norris, issued Aug. 24, 1993.

One problem with ceramic screen inks is that the colorant/dopant must be an inorganic pigment in order to withstand the high firing temperatures mentioned above. Many inorganic pigments, however, are derivatives of heavy metals (titanium dioxide being a notable exception) and, therefore, pose health and/or environmental risks. Additionally, as can readily be appreciated, the range of different colors afforded by the class of inorganic pigments is limited, due to the constraints of nature, as compared to that afforded by the class of organic colorants.

Still another problem with ceramic screen inks is that one must possess equipment capable of obtaining the very high firing temperatures discussed above in order to cure the ink once printed on the substrate. As can readily be appreciated, the expense of such equipment will, in many instances, preclude all but glass manufacturers from being able to screen print ceramic inks onto glass and the like.

Screen printing is not the only technique presently used to decorate or to label glass articles. One such alternative technique involves the use of heat-transfer labels. One well-known type of heat-transfer label is described in U.S. Pat. No. 3,616,015, inventor Kingston, which issued October, 1971, and which is incorporated herein by reference. In the aforementioned patent, there is disclosed a heat-transfer label comprising a paper sheet or web, a wax release layer affixed to the paper sheet, and an ink design layer printed on the wax release layer. In the heat-transfer labelling process, the label-carrying web is subjected to heat, and the label is pressed onto an article with the ink design layer making direct contact with the article. As the paper sheet is subjected to heat, the wax layer begins to melt so that the paper sheet can be released from the ink design layer, a portion of the wax layer being transferred with the ink design layer and a portion of the wax layer remaining with the paper sheet. After transfer of the design to the article, the paper sheet is immediately removed, leaving the design firmly affixed to the article and the wax transferred therewith exposed to the environment. The wax layer is thus intended to serve two purposes: (1) to provide release of the ink design from the web upon application of heat to the web and (2) to form a protective layer over the transferred ink design. After transfer of the label to the article, the transferred wax release layer is typically subjected to a post-flaming technique which enhances the optical clarity of the wax protective layer (thereby enabling the ink design layer therebeneath to be better observed) and which enhances the protective properties of the transferred wax release.

In some heat-transfer labels, an adhesive layer (e.g., solvent-soluble polyamide, acrylic or polyester) is deposited over the ink design to facilitate adhesion of the label onto a receiving article. An example of a heat-transfer label having an adhesive layer is disclosed in U.S. Pat. No. 4,548,857, inventor Galante, which issued Oct. 22, 1985, and which is incorporated herein by reference. Additionally, in some heat-transfer labels, a protective lacquer layer is interposed between the wax release layer and the ink layer. An example of such a label is disclosed in U.S. Pat. No. 4,426,422, inventor Daniels, which issued Jan. 17, 1984, and which is incorporated herein by reference.

Another type of heat-transfer label (i.e., a wax-less, heat-transfer label) is disclosed in U.S. Pat. No. 4,935,300, inventors Parker et al., which issued Jun. 19, 1990, and which is incorporated herein by reference. In the aforementioned patent, the label, which is said to be particularly well-suited for use on high density polyethylene, polypropylene, polystyrene, polyvinylchloride and polyethylene terephthalate surfaces or containers, comprises a paper carrier web which is overcoated with a layer of polyethylene. A protective lacquer layer comprising a polyester resin and a relatively small amount of a non-drying oil is printed onto the polyethylene layer. An ink design layer comprising a resinous binder base selected from the group consisting of polyvinylchloride, acrylics, polyamides and nitrocellulose is printed onto the protective lacquer layer. A heat-activatable adhesive layer comprising a thermoplastic polyamide adhesive is printed onto the ink design layer.

In general, the ink design layer of the above-described heat-transfer labels is formed by gravure printing onto the protective lacquer layer (or onto whichever layer it is desired to put the ink design layer) a design using an ink formulation comprising an organic resinous binder, a colorant and a vaporizable solvent system. The printed article is then heated, causing the solvent system to evaporate and causing the remaining non-volatile components to be set on the substrate. The resinous binder is typically selected from the group including polyamide, polyester, polyester-vinyl, acrylic, vinyl and acrylic-vinyl resins. The colorant is typically selected from the group including titanium dioxide and organic colorants (e.g., insoluble derivatives of organic dyes).

In those instances in which a heat-transfer label of the type described above is used to decorate a glass container, the glass container is typically pre-treated with a silane adhesion promoter of the type described in U.S. Pat. No. 3,907,974, inventor Smith, which issued Sep. 23, 1975, and which is incorporated herein by reference. The reason for silane-treatment is to make the glass container more receptive to the adhesive layer of the heat-transfer label. Glass containers are typically not receptive to heat-transfer labels because they are usually manufactured with a coating of stearate applied to the outside surface thereof, the stearate-coating impairing adhesion between the heat-transfer label and the glass container. The reason why stearate is typically applied to glass containers is to act as a lubricant to reduce scratching of adjacent glass containers following their manufacture. By silane-treating a stearate-coated glass container, it has been found that one can improve the adhesion between the glass container and a heat-transfer label.

SUMMARY OF THE INVENTION

It is an object of the present invention to provide a novel method for decorating and/or labelling glass articles and like ceramic ware.

It is another object of the present invention to provide a method as described above that involves screen printing.

It is still another object of the present invention to provide a method as described above that overcomes at least some of the problems discussed above in connection with the screen printing of glass articles and like ceramic ware.

Additional objects, as well as features, advantages and aspects of the present invention, will be set forth in part in the description which follows, and in part will be obvious from the description or may be learned by practice of the invention. In the description, reference is made to specific embodiments for practicing the invention. These embodiments will be described in sufficient detail to enable those skilled in the art to practice the invention, and it is to be understood that other embodiments may be utilized and that changes may be made without departing from the scope of the invention. The following detailed description is, therefore, not to be taken in a limiting sense, and the scope of the present invention is best defined by the appended claims.

In furtherance of the above and other objects that are herein disclosed or are apparent from the present specification, there is hereinafter provided a method for decorating and/or labelling a glass article or like ceramic ware, said method comprising the steps of: (a) treating the glass article with a silane adhesion promoter; and (b) applying a non-ceramic screen ink directly onto the silane-treated glass article by screen printing.

Preferably, said non-ceramic screen ink comprises an organic resinous binder, a non-heavy-metal colorant and a solvent system. Examples of the binder include, but are not limited to, one or more of polyamide, polyester, polyester-vinyl, acrylic, vinyl and acrylic-vinyl resins. Examples of the non-heavy metal colorant include titanium dioxide and organic colorants (e.g., insoluble derivatives of organic dyes). Said non-ceramic screen ink may additionally comprise one or more rheology-adjusting agents for making the ink well-suited for screen printing and may additionally include other additives of the type commonly found in screen or other printing inks.

Preferably, said non-ceramic screen ink is a heat-set ink. Accordingly, once the ink has been applied to the glass article by screen printing, the printed article is heated, causing the solvent system to evaporate and causing the binder, colorant and other non-volatile components of the ink to be set on the article.

In addition to being directed to the above-described method, the present invention is also directed to glass articles decorated by the above-described method.

DETAILED DESCRIPTION OF PREFERRED EMBODIMENTS

As indicated above, the present invention is directed to a novel method for decorating and/or labelling glass and related ceramic articles by screen printing. One important aspect of the present method is that ceramic screen inks are not used. One advantage of not using ceramic screen inks in the present method is that the firing temperatures discussed above that are needed to fuse a ceramic ink to a glass article are no longer needed nor is the equipment for generating such firing temperatures needed. Moreover, because ceramic inks require the use of certain colorants that are stable even when subjected to the aforementioned types of firing temperatures, such as heavy-metal inorganic pigments (many of which pose health and/or environmental risks), the elimination of ceramic inks in the present method makes possible the use of colorants that do not have the disadvantages associated with heavy-metal inorganic pigments.

Simply stated, the present method comprises the steps of (a) treating a glass article or the like with a silane adhesion promoter; and (b) applying a non-ceramic screen ink directly onto the silane-treated glass article by screen printing.

The treatment of glass and like articles with silane adhesion promoters in accordance with the present invention is done in the conventional manner, as evidenced by U.S. Pat. No. 3,907,974. Typically, silane-treatment comprises spraying or spreading (using a belt) a silane solution onto a glass article at room temperature. The treated article is then heated prior to decoration, typically to about 200°–250° F., thereby driving off the volatile components (e.g., water) of the silane solution and leaving behind the nonvolatile components (e.g., silane) of the solution on the glass article. Examples of silane solutions include, but are not limited to, HYDROSIL HS 3202 (Huls America Inc., Piscataway, N.J.), T-185995 (Seagrave), SILANE Z-6020 (Dow) and A-1100 (Union Carbide).

The non-ceramic screen ink of the present invention preferably comprises an organic resinous binder, a non-heavy metal colorant and a suitable solvent system. Examples of the organic resinous binder include, but are not limited to, one or more of polyamide, polyester, polyester-vinyl, acrylic, vinyl and acrylic-vinyl resins.

Examples of the non-heavy metal colorant include titanium dioxide and the class of organic colorants, including insoluble derivatives of organic dyes. Examples of organic colorants include, but are not limited to, carbon black, phthalocyanine blue and green, naphthol red and diarylide yellow. Additional examples of organic colorants are disclosed in U.S. Pat. No. 4,321,185, inventor Benitez, issued Mar. 23, 1982 and U.S. Pat. No. 5,389,717, inventors Santini et al., issued Feb. 14, 1995, both of which are incorporated herein by reference.

The non-ceramic screen ink of the present invention may additionally comprise one or more rheology-adjusting agents for making the ink well-suited for screen printing. Examples of said rheology-adjusting agents include, but are not limited to, silicas, clays and gums. Specific rheology-adjusting agents are disclosed in U.S. Pat. No. 5,217,255, inventors Lin et al., issued Jun. 8, 1993, which is incorporated herein by reference, as well as the aforementioned U.S. Pat. No. 5,389,717.

The non-ceramic screen ink of the present invention may further include other additives of the type commonly found in screen or other printing inks. Examples of such additives include preservatives, anti-corrosion agents and the like.

Preferably, the non-ceramic screen ink of the present invention is a heat-set ink, the solvent system therein being vaporizable. Accordingly, once the ink has been applied to the glass article by screen printing, the printed article is heated, causing the solvent system to evaporate and causing the binder, colorant and other non-volatile components of the ink to be set on the article.

The non-ceramic screen ink of the present invention may be made by adding one or more rheology-adjusting agents, if necessary, to any one of the inks used to make the ink design layer of the heat-transfer labels described in, for example, U.S. Pat. No. 4,935,300, inventors Parker et al., issued Jun. 19, 1990; U.S. Pat. No. 4,548,857, inventor Galante, issued Oct. 22,1985; U.S. Pat. No. 4,426,422, inventor Daniels, issued Jan. 17, 1984; U.S. Pat. No. 3,907,974, inventor Smith, issued Sep. 23, 1975, all of which are incorporated herein by reference.

The following Examples illustrate certain aspects of the present invention and, in no way, should be limiting:

EXAMPLE I

| Ingredient | Percentage by weight |
|---|---|
| ViTEL ® 2700[†] | 18.0 |
| phthalocyanine (blue pigment) | 7.0 |
| toluene | 45.0 |
| n-propyl acetate | 27.0 |
| SYLOID 244* | 3.0 |

[†]ViTEL ® 2700 is a copolyester resin having a high tensile strength (7000 psi) and a low elongation (4% elongation) commercially available from Shell Chemical Company, Akron, OH.
*SYLOID 244 is a synthetic amorphous silica commercially available from W. R. Grace & Co.

The above-described screen ink was applied to a silane-treated glass container by screen printing. The decorated glass container was then heated in an oven until the glass container reached a temperature of 400° F. (which took about 5–15 minutes) to cure the printed ink.

EXAMPLE II

| Ingredient | Percentage by weight |
|---|---|
| ELVACITE ® 2045[‡] | 21.0 |
| phthalocyanine (blue pigment) | 7.0 |
| toluene | 36.0 |
| methyl ethyl ketone | 33.0 |
| SYLOID 244 | 3.0 |

[‡]ELVACITE ® 2045 is a high molecular weight isobutyl methacrylate resin having an inherent viscosity of 0.64 (as measured in a solution containing 0.25 g of polymer in 50 ml methylene chloride, measured at 20° C. using a No. 50 Cannon-Fenske Viscometer) commercially available from ICI Acrylics, Inc., Wilmington, DE.

The above-described screen ink was applied to a silane-treated glass container. The decorated glass container was then heated in an oven until the glass container reached a temperature of 400° F. (which took approximately 5–15 minutes) to cure the printed ink.

The embodiments of the present invention recited herein are intended to be merely exemplary and those skilled in the art will be able to make numerous variations and modifications to it without departing from the spirit of the present invention. Certain variations and modifications, while producing less than optimal results, may still produce satisfactory results. All such variations and modifications are intended to be within the scope of the present invention as defined by the claims appended hereto.

What is claimed is:

1. A method for decorating a glass article, said method comprising the steps of:

(a) treating the glass article with a silane adhesion promoter;

(b) screen printing a screen ink directly onto the silane-treated glass article, said screen ink being a heat-set ink comprising an organic resinous binder, a non-heavy metal colorant and an organic solvent system; and (c) heating the screen-printed, silane-treated glass article to a temperature of about 400° F. whereby the organic solvent system is evaporated therefrom and the organic resinous binder and the non-heavy metal colorant become set thereon.

2. The method as claimed in claim 1 wherein said organic resinous binder is selected from the group consisting of one or more of polyamide, polyester, polyester-vinyl, acrylic, vinyl and acrylic-vinyl binders.

3. The method as claimed in claim 2 wherein said organic resinous binder is a polyamide binder.

4. The method as claimed in claim 2 wherein said organic resinous binder is a polyester binder.

5. The method as claimed in claim 2 wherein said organic resinous binder is an acrylic binder.

6. The method as claimed in claim 1 wherein said non-heavy metal colorant is selected from the group consisting of titanium dioxide and organic colorants.

7. The method as claimed in claim 6 wherein said non-heavy metal colorant is titanium dioxide.

8. The method as claimed in claim 6 wherein said non-heavy metal colorant is an organic colorant.

9. The method as claimed in claim 1 wherein said screen ink further includes a rheology-adjusting agent.

10. The method as claimed in claim 9 wherein said rheology-adjusting agent is a silica.

11. The method as claimed in claim 1 wherein said screen ink comprises 18.0%, by weight, of a copolyester resin having a tensile strength of 7000 psi and 4% elongation; 7.0%, by weight, of phthalocyanine; 45.0%, by weight, of toluene; 27.0%, by weight, of n-propyl acetate; and 3.0%, by weight, of a synthetic amorphous silica.

12. The method as claimed in claim 1 wherein said screen ink comprises 21.0%, by weight, of an isobutyl methacrylate resin having an inherent viscosity of 0.64 as measured in a solution containing 0.25 g of polymer in 50 ml methylene chloride, measured at 20° C. using a No. 50 Cannon-Fenske Viscometer; 7.0%, by weight, of phthalocyanine; 36.0%, by weight, of toluene; 33.0%, by weight, of methyl ethyl ketone; and 3.0%, by weight, of a synthetic amorphous silica.

13. The method as claimed in claim 1 wherein said treating step comprises applying a silane solution to the glass article and then heating the glass article so as to evaporate the volatile components of the silane solution from the glass article.

* * * * *